(12) United States Patent  (10) Patent No.: US 7,211,746 B2
Goble  (45) Date of Patent: May 1, 2007

(54) WEIGH-PAN METERING AND BLENDING METHOD AND APPARATUS

(75) Inventor: Ronald Lee Goble, Gastonia, NC (US)

(73) Assignee: Diversified Textile Machinery Corporation, Kings Mountain, NC (US)

( * ) Notice: Subject to any disclaimer, the term of this patent is extended or adjusted under 35 U.S.C. 154(b) by 48 days.

(21) Appl. No.: 11/120,798

(22) Filed: May 3, 2005

(65) Prior Publication Data

US 2005/0241863 A1 Nov. 3, 2005

Related U.S. Application Data

(60) Provisional application No. 60/567,733, filed on May 3, 2004.

(51) Int. Cl.
*D01G 15/40* (2006.01)
*G01G 13/00* (2006.01)

(52) U.S. Cl. .......................... 177/90; 177/92; 177/116; 19/105; 19/300

(58) Field of Classification Search ............ 177/58–59, 177/61, 65, 90–105, 116–123; 19/105, 300
See application file for complete search history.

(56) References Cited

U.S. PATENT DOCUMENTS 3,734,215 A * 5/1973 Smith ........................... 177/59
4,616,722 A * 10/1986 Moran .......................... 177/99
4,753,306 A * 6/1988 Mosher ..................... 177/25.19
4,874,049 A * 10/1989 Kee et al. ...................... 177/59
5,802,674 A * 9/1998 Barber ......................... 19/105
2005/0109547 A1* 5/2005 Sugioka et al.

* cited by examiner

Primary Examiner—Randy W. Gibson
(74) Attorney, Agent, or Firm—Adams Evans P.A.

(57) ABSTRACT

A weigh-pan metering and blending apparatus having a holding chamber for receiving fiber from a fiber distributer and providing temporary storage of the fiber. The metering chamber meters the fiber received from the holding chamber, wherein the metering chamber includes at least one discharge device for advancing the fiber to diverter doors pivotally mounted at one end of the metering chamber for oscillating movement between first and second downstream delivery openings. First and second weigh-pans communicating with respective ones of the first and second downstream delivery openings receive the fiber from the metering chamber. First and second discharge chambers receive the fiber from respective ones of the first and second weigh-pans, wherein the first and second discharge chambers include a discharge device for advancing the fiber to adjacent transfer ducts for discharge.

6 Claims, 2 Drawing Sheets

WEIGH-PAN METERING AND BLENDING METHOD AND APPARATUS

This application claims benefit of provisional application No. 60/567,733 filed on 3 May 2004.

TECHNICAL FIELD AND BACKGROUND OF THE INVENTION

This patent relates to the process of taking pre-opened virgin or natural fiber, putting the fiber into a control holding or distributing system, and control feeding or metering these fibers into a double weigh-pan system. The system has particular application in the upholstered furniture industry, where pillow and cushions are filled with opened fibers, and also in the textiles nonwovens fields, where different fibers are blended together for a specific blend. Examples include 65/35 cotton/polyester blend and the addition to a fiber of 10–15 percent of a binder fiber to add strength to the blend. Present practices require significant labor to fill these items, and to rework a significant percentage that are either over-filled or underfilled. Overfilled items waste fiber and increase costs by utilizing more fiber than necessary to achieve a first quality product. Underfilled items are considered defective and must be either emptied and refilled, or supplemented with additional fiber, thus requiring additional labor and production delays. The present invention provides an apparatus and method of quickly and accurately filling pillows and cushions with an exact amount of fiber, as required. PLC's permit the amount of fiber to be dispensed to be predetermined according to wide variations in the weight being dispensed, including the provision for dispensing the same weight to both pans during each fill cycle, different weights to each pan during each fill cycle, or varying weights from one or both pans as needed to fill pillows or cushions having different volume and/or density requirements.

SUMMARY OF THE INVENTION

Therefore, it is an object of the invention to provide a weigh-pan metering and blending apparatus which can operate continuously thereby increasing production rates.

It is another object of the present invention to provide a weigh-pan metering and blending method that can operate continuously thereby increasing production rates.

It is another object of the present invention to provide a weigh-pan metering and blending apparatus that can quickly and accurately fill pillows and cushions with an exact amount of fiber.

It is another object of the present invention to provide a weigh-pan metering and blending method for quickly and accurately filling pillows and cushions with an exact amount of fiber.

It is another object of the present invention to provide a weigh-pan metering and blending apparatus that can be programmed for producing different weights of fiber in any desired sequence.

It is another object of the present invention to provide a weigh-pan metering and blending method for producing different weights of fiber in any desired sequence.

It is another object of the present invention to provide a weigh-pan metering and blending apparatus equipped with a nozzle positioned on the transfer ducts for interrupting the flow of fiber.

It is another object of the present invention to provide a weigh-pan metering and blending method for interrupting the flow of fiber in the transfer ducts.

According to one embodiment of the invention, the two weigh-pans are located under a fiber holding and metering chamber. Fiber is metered alternately into the two weigh pans. As fibers are metered into one of the two pans, and as that pan is reaching its desired weight, the metering system can be slowed down to trickle feed the fiber into the weigh pan or keep on feeding at the same previous rate. When the first weigh pan reaches its desired weight a set of diverter doors in the bottom of the fiber holding chamber will switch to the second pan (not stopping the metering process) and start feeding or distributing fiber into the second pan.

As the first pan is being filled to its desired weight the metering system can be slowed down to trickle feed the fibers into the weigh pan (for better weight control) or keep on feeding at the same previous rate. When the weigh pan reaches its desired weight the diverter door will switch and start feeding the other weigh pan if it is empty and requires fiber. If the pan does not need fiber the diverter doors will stay in the same position and wait for the pan to empty out and request more fiber.

While feeding the second pan, the first pan checks its weight, calibrates itself if necessary (this process is going on while the fiber chamber is feeding the other weigh pan). This process of double pans under a fiber chamber with diverter doors allows the feeding system to run 100% of the time, increasing production. This is in contrast to conventional single weigh pan, that has to stop feeding so that the pan can check its weight and calibrate itself before it can be fed again. One of the pans is checking itself while the other is being fed. A PLC program controls the feeding, weighing, and calibrating, and can be programmed to feed a keyed in, observed weight by use of a touch screen, or by pre-entered instructions or programs. A single weigh pan can be programmed to give a certain desired weight every time or can be programmed to give different weights in any desired sequence. For example if fiber is being blown or fed into a certain weight pillow or cushion, it will produce that certain desired weight every time, but if the fiber is being fed or blown into a 2-3-4-5 chamber couch back or seat with different weights in each chamber, the PLC can be pre-programmed to meter and discharge a different weight each time.

More specifically, the objects of the present invention are achieved in the preferred embodiments disclosed below by providing a weigh-pan metering and blending apparatus having a holding chamber for receiving fiber from a fiber distributer and providing temporary storage of the fiber. The metering chamber meters the fiber received from the holding chamber, wherein the metering chamber includes at least one discharge device for advancing the fiber to diverter doors pivotally mounted at one end of the metering chamber for oscillating movement between first and second downstream delivery openings. First and second weigh-pans communicating with respective ones of the first and second downstream delivery openings receive the fiber from the metering chamber. First and second discharge chambers receive the fiber from respective ones of the first and second weigh-pans, wherein the first and second discharge chambers include discharge means for advancing the fiber to adjacent transfer ducts for discharge.

According to one preferred embodiment of the invention, a signal generator is positioned on the holding chamber for terminating the supply of the fiber when the signal generator indicates a predetermined amount of the fiber is present in the holding chamber.

According to another preferred embodiment of the invention, the discharge device in the metering chamber includes at least one metering roll which meters the fiber into at least one radially positioned pin beater roll for advancing the fiber to the diverter doors.

According to yet another preferred embodiment of the invention, the first and second weigh-pans including respective electronic load cells for releasing the fiber when the electronic load cells indicate a predetermined fiber weight.

According to yet another preferred embodiment of the invention, the transfer ducts transfer the fiber to a nozzle containing a valve that, when activated, interrupts the flow of the fiber.

According to yet another preferred embodiment of the invention, at least one control unit is used to receive operating parameters from an operator or pre-entered instructions or programs that controls the feeding, weighing, and calibrating of the fiber.

A preferred method for weigh-pan metering and blending according to the invention includes providing a weigh-pan apparatus, the weigh-pan apparatus includes a metering chamber, first and second weigh-pans, first and second discharge chambers, and transfer ducts for discharging the fibrous. The fiber is then supplied from an upstream source into the metering chamber, which meters the fiber. The fiber is then discharged from the metering chamber into the first and second weigh-pans. The weigh-pans supply the fiber to the first and second discharge chambers for advancing the fiber to adjacent transfer ducts for discharge.

In another preferred method for weigh-pan metering and blending according to the invention includes supplying the fiber to a fiber distributor, storing the fiber in a holding chamber, and discharging the fiber at a predetermined weight.

In yet another preferred method for weigh-pan metering and blending according to the invention includes generating a signal indicative of the amount of the fiber in the first and second weigh-pans, and discharging the fiber at a predetermined weight as indicated by the signal.

In yet another preferred method for weigh-pan metering and blending according to the invention includes discharging the fiber through a nozzle.

In yet another preferred method for weigh-pan metering and blending according to the invention includes generating a signal when a predetermined amount of the fiber is in the holding chamber for terminating the supply of the fiber from the fiber distributor.

In yet another preferred method for weigh-pan metering and blending according to the invention includes activating a valve positioned on the nozzle to interrupt the flow of the fiber.

BRIEF DESCRIPTION OF THE DRAWINGS

Some of the objects of the invention have been set forth above. Other objects and advantages of the invention will appear as the invention proceeds when taken in conjunction with the following drawings, in which.

DETAILED DESCRIPTION OF THE PREFERRED EMBODIMENT AND BEST MODE

Figure 1:
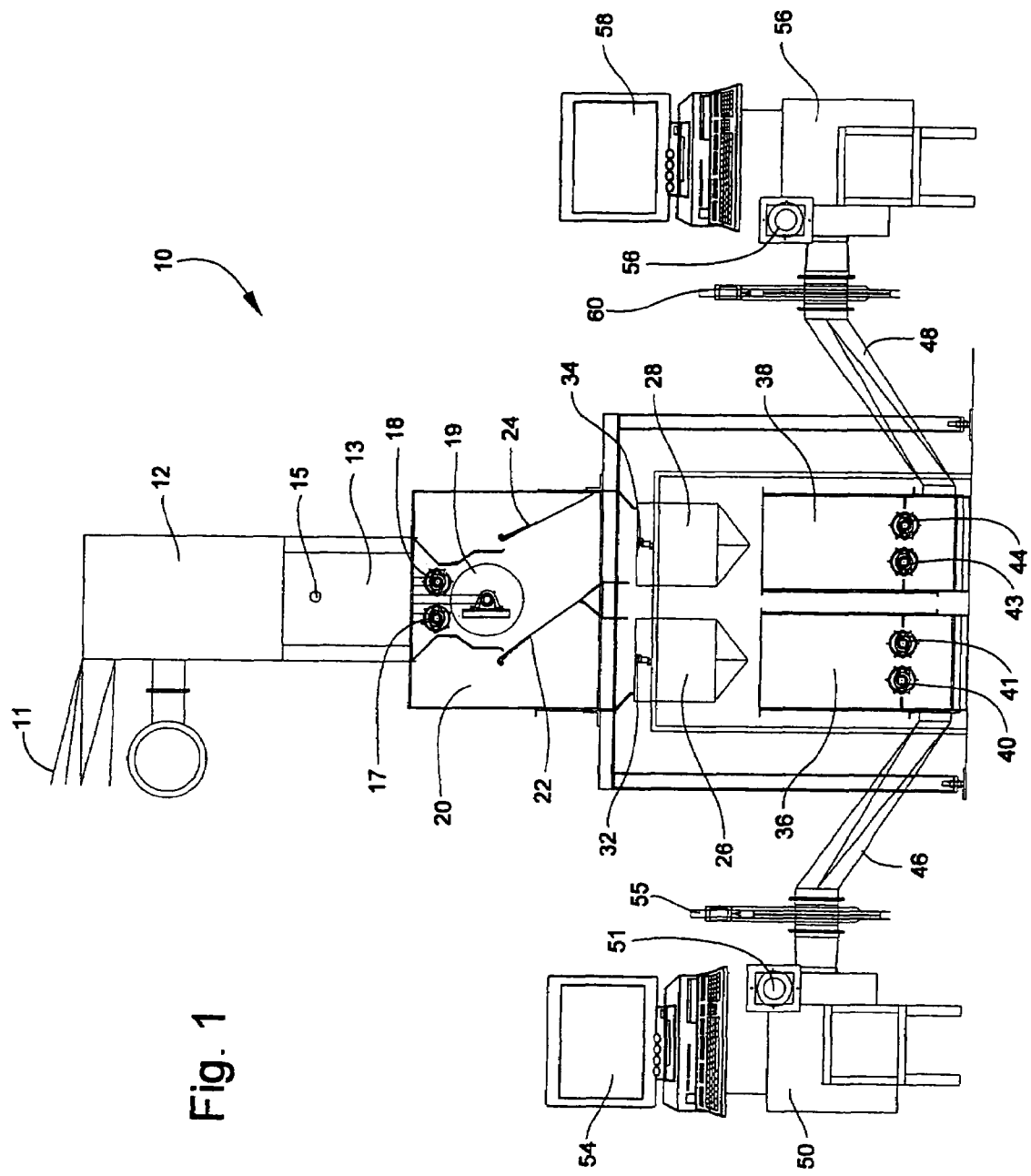
FIG. 1 is a side elevation schematic view of one embodiment of a weigh-pan apparatus according to one preferred embodiment of the invention, showing the diverter doors in a first position for feeding fiber into a first weigh pan.
Figure 2:
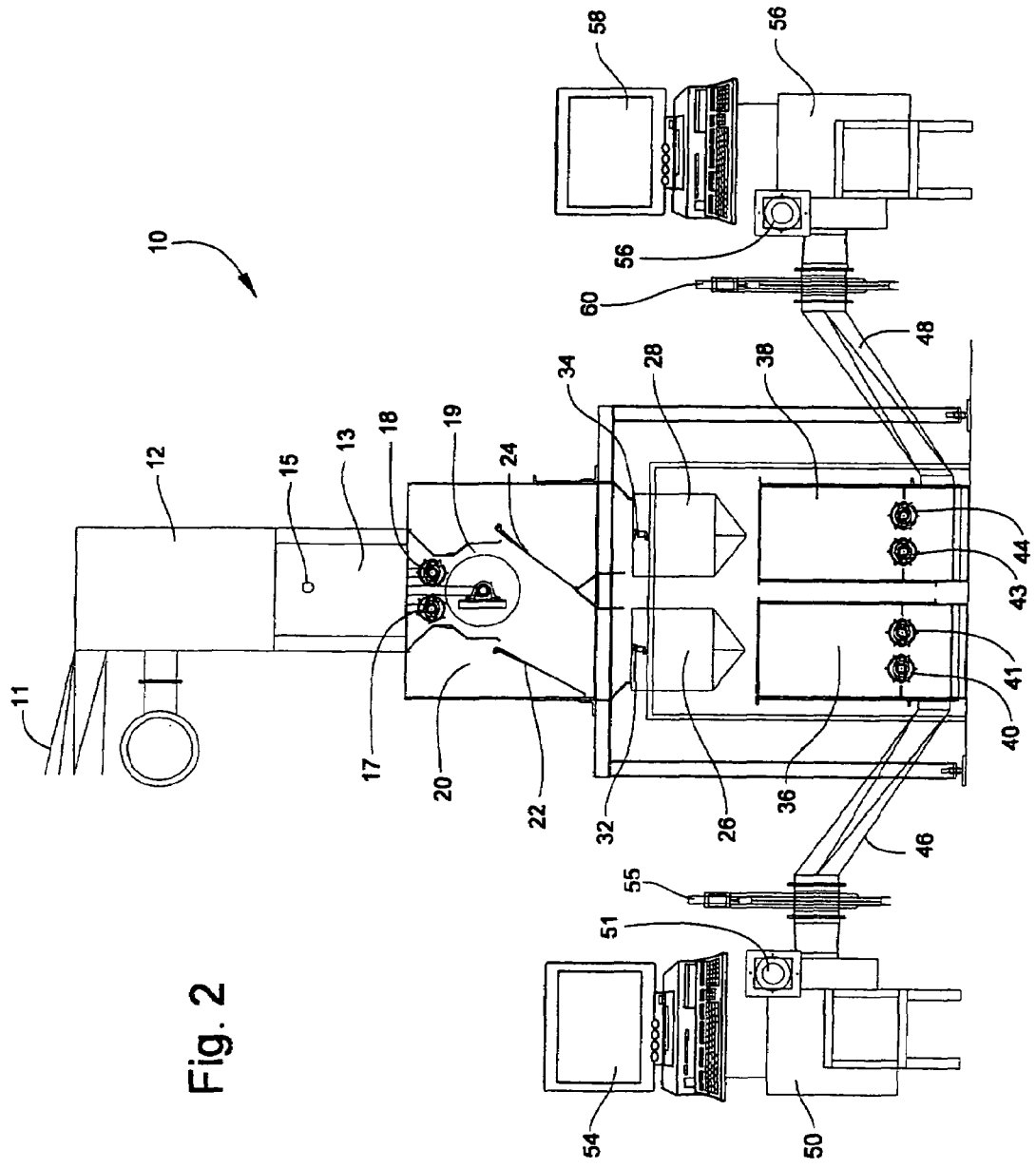
FIG. 2 is a side elevation schematic view of one embodiment of a weigh-pan apparatus according to one preferred embodiment of the invention, showing the diverter doors in a second position for feeding fiber into a second weigh pan.

Referring now to the drawings, FIGS. 1 and 2 illustrate a weigh pan apparatus 10 according to the invention and adapted to operate according to the process described above. Pre-opened fiber entrained in an moving air stream enters the apparatus 10 through an entrance plenum 11 from an upstream fiber source, not shown. The fiber enters a fiber distributor 12 and falls into a holding chamber 13. The fill rate is controlled by an electric eye 15 that stops fiber from being introduced into the system when necessary to prevent overfilling, and calls for additional fiber when needed.

Metering rolls 17, 18 meter fiber into a pin beater roll 19 and into a metering chamber 20. A pair of diverter doors 22, 24 are pivoted to move alternately between two positions—a first position shown in FIG. 1 where the opened fiber is diverted from the metering chamber 20 into a first weigh-pan 28, and a second position shown in FIG. 2 where the opened fiber is diverted from the metering chamber 20 into a second weigh-pan 26. Electronic load cells 32, 34 are electronically connected to respective weigh-pans 26, 28 and sense the weight of the fiber discharged into the weigh pans. When the predetermined weight has entered the weigh-pans 26, 28, the weigh-pans 26, 28 open, discharging the contents into respective holding chambers 36, 38. When commanded by, for example a foot pedal, switch, timer or other activation device, fiber located in the discharge chambers 36, 38 is discharged by feed rolls 40, 41 (discharge chamber 36) and feed rolls 43, 44 (discharge chamber 38) into ducts 46, 48.

Fiber is transferred by duct 46 to a station 50, including a fan, where a production worker is positioned. The fiber, entrained in an airstream, is discharged through a nozzle 51 into a pillow or cushion being held by the worker over the nozzle 51. The touch screen and PLC 54 permit the worker or other personnel to control and vary the operation of the system. A valve 55 permits the flow of fiber and air to the station 50 to be interrupted.

Fiber is transferred by duct 48 to a station 56, including a fan, where a production worker is positioned. The fiber, entrained in an airstream, is discharged through a nozzle 56 into a pillow or cushion being held by the worker over the nozzle 56. The touch screen and PLC 58 permit the worker or other personnel to control and vary the operation of the system. A valve 60 permits the flow of fiber and air to the station 56 to be interrupted.

A weigh-pan metering and blending apparatus and methods are described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A weigh-pan metering and blending apparatus, comprising:
   (a) a holding chamber for receiving fiber from a fiber distributer and providing temporary storage of the fiber;
   (b) a metering chamber for metering the fiber received from the holding chamber, wherein the metering chamber includes at least one discharge device for advancing the fiber to diverter doors pivotally mounted at one end of the metering chamber for oscillating movement between first and second downstream delivery openings;

(c) first and second weigh-pans communicating with respective ones of the first and second downstream delivery openings for receiving the fiber from the metering chamber; and (d) first and second discharge chambers for receiving the fiber from respective ones of the first and second weigh-pans, the first and second discharge chambers including discharge means for advancing the fiber to adjacent transfer ducts for discharge.

2. A weigh-pan metering apparatus according to claim 1, including a signal generator positioned on the holding chamber for terminating the supply of the fiber when the signal generator indicates a predetermined amount of the fiber is present in the holding chamber.

3. A weigh-pan metering apparatus according to claim 1, wherein the discharge device in the metering chamber includes at least one metering roll which meters the fiber into at least one radially positioned pin beater roll for advancing the fiber to the diverter doors.

4. A weigh-pan metering apparatus according to claim 1, wherein the first and second weigh-pans including respective electronic load cells for releasing the fiber when the electronic load cells indicate a predetermined fiber weight.

5. A weigh-pan metering apparatus according to claim 1, wherein the transfer ducts transfer the fiber to a nozzle containing a valve that, when activated, interrupts the flow of the fiber.

6. A weigh-pan metering apparatus according to claim 1, including at least one control unit for receiving operating parameters from an operator or pre-entered instructions or programs that controls the feeding, weighing, and calibrating of the fiber.

* * * * *